US010883838B2

(12) United States Patent
Hackert et al.

(10) Patent No.: US 10,883,838 B2
(45) Date of Patent: Jan. 5, 2021

(54) SYSTEM WITH AT LEAST TWO SELF-TRAVELING FLOOR TREATMENT APPARATUSES

(71) Applicant: Vorwerk & Co. Interholding GmbH, Wuppertal (DE)

(72) Inventors: Georg Hackert, Bochum (DE); Martin Helmich, Duisburg (DE); Lorenz Hillen, Wuppertal (DE); Christian Holz, Dortmund (DE); Gerhard Isenberg, Cologne (DE); Hendrik Koetz, Wetter (DE); Andrej Mosebach, Bochum (DE); Roman Ortmann, Huerth (DE); Robin Dulinski, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 125 days.

(21) Appl. No.: 16/008,191

(22) Filed: Jun. 14, 2018

(65) Prior Publication Data

US 2018/0364052 A1    Dec. 20, 2018

(30) Foreign Application Priority Data

Jun. 16, 2017   (DE) ........................ 10 2017 113 286

(51) Int. Cl.
*G01C 21/32* (2006.01)
*G05D 1/02* (2020.01)
*A47L 9/00* (2006.01)

(52) U.S. Cl.
CPC .............. *G01C 21/32* (2013.01); *A47L 9/009* (2013.01); *G05D 1/024* (2013.01); *G05D 1/0272* (2013.01);

(Continued)

(58) Field of Classification Search
CPC ..... G01C 21/32; G05D 1/0287; G05D 1/0293
See application file for complete search history.

(56) References Cited

U.S. PATENT DOCUMENTS

| 9,307,368 | B1 | 4/2016 | Bartlett |
| 2009/0198376 | A1* | 8/2009 | Friedman ............... G08C 17/00 700/248 |

(Continued)

FOREIGN PATENT DOCUMENTS

| DE | 10 2008 014 912 A1 | 9/2009 |
| DE | 10 2011 000 536 A1 | 8/2012 |

OTHER PUBLICATIONS

A Floor and Obstacle Height Map for 3D Navigation of a Humanoid Robot, Jens-Steffen Gutmann, Masaki Fukuchi, and Masahiro Fujita (Year: 2005).*

*Primary Examiner* — Abby Y Lin
*Assistant Examiner* — Renee LaRose
(74) *Attorney, Agent, or Firm* — Collard & Roe, P.C.

(57) ABSTRACT

A system has at least two self-traveling floor treatment apparatuses, wherein each of the floor treatment apparatuses features a navigation and self-localization device that is designed for generating an environment map based on environment data of the environment of the floor treatment apparatus, which is recorded by means of a detection device. In order to realize an advantageous cooperation between the floor treatment apparatuses, it is proposed that a common memory unit for storing environment maps and a computing unit are assigned to the floor treatment apparatuses, wherein the computing unit is designed for comparing an environment map of a first floor treatment apparatus with an environment map of a second floor treatment apparatus and/or with an environment map stored in the common memory unit and for specifying which of the environment (Continued)

maps is stored in the common memory unit and/or in a local memory of a floor treatment apparatus based on a defined selection criterion.

10 Claims, 2 Drawing Sheets

(52) U.S. Cl.
CPC ......... *G05D 1/0274* (2013.01); *G05D 1/0287* (2013.01); *A47L 2201/04* (2013.01); *G05D 2201/0203* (2013.01); *G05D 2201/0215* (2013.01)

(56) References Cited

U.S. PATENT DOCUMENTS

| | | | |
|---|---|---|---|
| 2018/0317725 A1* | 11/2018 | Lee | A47L 9/28 |
| 2019/0080463 A1* | 3/2019 | Davison | G05D 1/0253 |
| 2019/0302796 A1* | 10/2019 | Watanabe | A47L 9/28 |

* cited by examiner

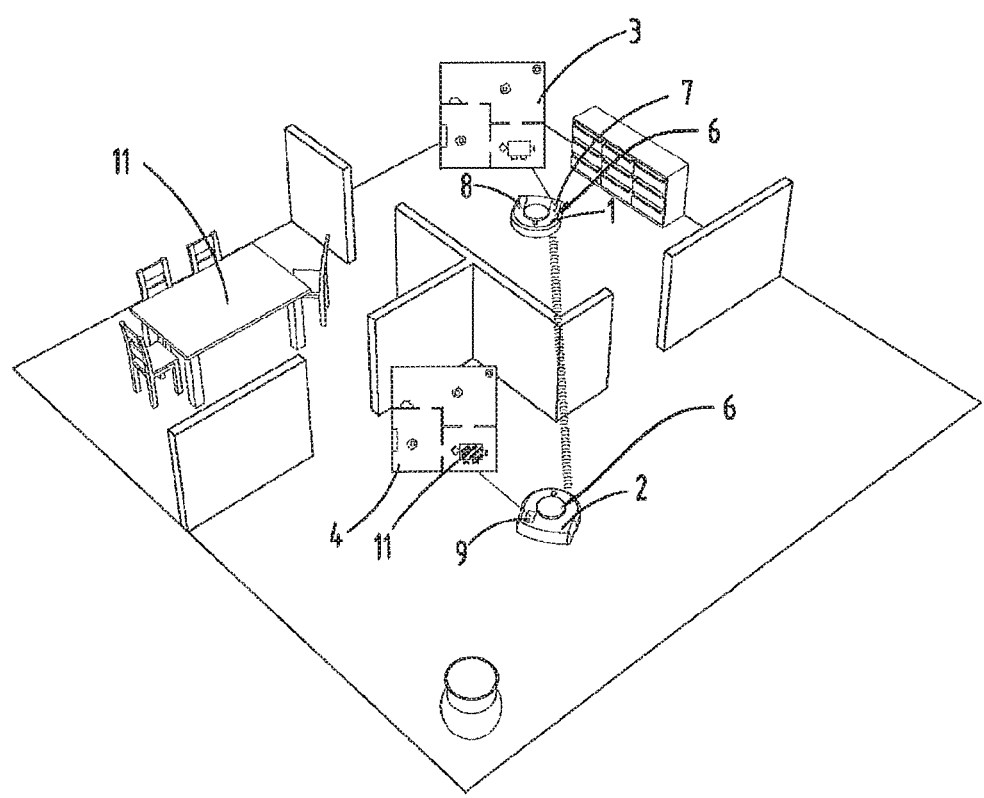

SYSTEM WITH AT LEAST TWO SELF-TRAVELING FLOOR TREATMENT APPARATUSES

CROSS REFERENCE TO RELATED APPLICATIONS

Applicant claims priority under 35 U.S.C. § 119 of German Application No. 10 2017 113 286.4 filed Jun. 16, 2017, the disclosure of which is incorporated by reference.

BACKGROUND OF THE INVENTION

1. Field of the Invention

The invention pertains to a system with at least two self-traveling floor treatment apparatuses, wherein each of the floor treatment apparatuses features a navigation and self-localization device that is designed for generating an environment map based on environment data of the environment of the floor treatment apparatus, which is recorded by means of a detection device.

The invention furthermore pertains to a method for operating a system with at least two self-traveling floor treatment apparatuses, wherein a detection device records environment data within the environment of the floor treatment apparatus, and wherein a navigation and self-localization device of the floor treatment apparatus generates an environment map based on the environment data.

2. Description of the Related Art

Self-traveling floor treatment apparatuses are sufficiently known from the prior art. It is furthermore known to connect two or more of these floor treatment apparatuses into a system such that they interact with respect to their operation.

Floor treatment apparatuses of the aforementioned type particularly are autonomous floor treatment robots such as, for example, cleaning robots for vacuuming, wiping, polishing, grinding and/or lawn mowing. Each floor treatment apparatus features a navigation and self-localization device that detects and processes environment data into an environment map.

For example, publications DE 10 2011 000 536 A1 and DE 10 2008 014 912 A1 describe self-traveling cleaning robots for cleaning floors. The cleaning robots are preferably equipped with distance sensors that measure distances from obstacles. An environment map, based on which a traveling route of the cleaning robot can be planned, is generated from the measured distance data. For example, the distance sensors operate in a contactless fashion with the aid of light and/or ultrasound. It is furthermore known to provide a cleaning robot with means for an all-around distance measurement, e.g., in the form of an optical triangulation system, which is arranged on a platform or the like that rotates about a vertical axis. The acquired distance data is processed into an environment map by means of the navigation and self-localization device and stored in a memory integrated into the cleaning robot such that this environment map can be accessed in the course of a work cycle of the cleaning robot.

If multiple self-traveling floor treatment apparatuses are used within the same environment, it is possible that the floor treatment apparatuses of the system have available different environment data depending on the respectively measured environment data, the type of detection device used or other parameters of the respective navigation and self-localization device of the respective floor treatment apparatus.

SUMMARY OF THE INVENTION

Based on the aforementioned prior art, the invention is therefore based on the objective of enhancing a system comprising multiple self-traveling floor treatment apparatuses, particularly to the effect that the floor treatment apparatuses advantageously cooperate and support one another.

In order to attain the above-defined objective, the invention proposes a system with at least two floor treatment apparatuses, to which a common memory unit for storing environment maps and a computing unit are assigned, wherein the computing unit is designed for comparing an environment map of a first floor treatment apparatus with an environment map of a second floor treatment apparatus and/or with an environment map stored in the common memory unit and for specifying which of the environment maps is stored in the common memory unit and/or in a local memory of a floor treatment apparatus based on a defined selection criterion.

According to the invention, the floor treatment apparatuses of the system now cooperate in such a way that they make their environment maps available to another floor treatment apparatus. In this way, the floor treatment apparatuses of the system can respectively adapt their floor treatment activity to the other floor treatment apparatus. Due to the use of a common environment map, environment data of one of the floor treatment apparatuses can be reconstructed by another floor treatment apparatus. In this way, a misinterpretation and a floor treatment activity, which may be carried out at an incorrect location, are prevented. This is particularly advantageous in instances, for example, in which two floor treatment apparatuses with identical or different treatment capabilities cooperate and a first floor treatment apparatus takes over a task from a second floor treatment apparatus or continues its floor treatment activity. The computing unit of the system, which is assigned to the common memory unit, is designed for comparing the different environment maps of the floor treatment apparatuses and for selecting one of the environment maps that is preferably used by all floor treatment apparatuses of the system. If different environment maps exist within the system, for example within a local memory of a first floor treatment apparatus, within a local memory of a second floor treatment apparatus and within a common memory unit of the system, the computing unit determines the environment map to be used by all apparatuses of the system based on the selection criterion. For this purpose, the computing unit may be designed for specifying a certain environment map as master map. Other environment maps of the system, for example in a local memory of the floor treatment apparatuses, are preferably overwritten with this environment map. This ensures that the floor treatment apparatuses of the system are on the same information level with respect to the environment data. For example, environment data from different sections of the environment can thereby also be combined such that an overall map of a residence can be generated and all environment data can be accessed by all floor treatment apparatuses, namely even floor treatment apparatuses that have not yet detected any environment data in a few sections of the environment. In order to specify a certain environment map to be used by multiple floor treatment apparatuses or preferably all floor treatment apparatuses of the system, the environment maps are compared with one another and evaluated based on one or more defined selection criteria, wherein the environment map, which best meets the defined selection criteria, is specified as master map. In this case, an environment map of a first floor treatment apparatus can be compared with an environment map of a second floor treatment apparatus and it can then be decided which of the environment maps is to be stored in the common memory unit of the system as master map based on the defined selection criteria. According to this embodiment, a comparison between two environment maps of different floor treatment apparatuses is carried out prior to the storage within the common memory unit in order to decide which environment map should be stored. According to another embodiment, an environment map of a floor treatment apparatus can also be compared with an environment map that is already stored in the common memory unit, wherein it is specified which of the environment maps is stored in the local memory of the floor treatment apparatus and/or in the common memory unit. Depending on the defined selection criteria, for example, the local environment map of the floor treatment apparatus may either be preserved within its local memory or overwritten with the environment map stored in the common memory unit, wherein the environment map stored in the common memory unit is in the latter instance copied into the local memory of the floor treatment apparatus in order to thereby overwrite the previous local environment map of the floor treatment apparatus. This applies accordingly to the selection of the environment map to be stored in the common memory unit.

The communication between the floor treatment apparatus and the common memory unit of the system is preferably realized in a wireless fashion. Wireless communication, for example, by means of WLAN, Bluetooth and/or ZigBee is particularly suitable in this respect. The computing unit assigned to the common memory unit compares the environment maps of the floor treatment apparatuses and/or the common memory unit with one another. During its progressive motion through the environment, each of the self-traveling floor treatment apparatuses generates an environment map, which can then either be replaced with an environment map stored in the common memory unit or replace the environment map stored in the common memory unit depending on the one or more defined selection criteria. The common memory unit likewise serves for reconciling the environment maps stored in the two or more floor treatment apparatuses such that the floor treatment apparatuses access the same environment map and have available the same information on the environment during their operation. It would particularly be conceivable that both floor treatment apparatuses transmit their initially self-generated environment maps to the common memory unit, whereupon the computing unit compares the two environment maps and decides based on one or more defined selection criteria which environment map is stored within the common memory unit and also adopted by the floor treatment apparatus, which previously generated a different environment map. One environment map intended for use by all floor treatment apparatuses is advantageously stored in the common memory unit and, if applicable, updated by at least one of the floor treatment apparatuses depending on the selection criterion to be applied. The stored environment map is updated in case the environment map of one of the floor treatment apparatuses is, based on the defined selection criteria, determined to be a more advantageous map version than the previously stored environment map.

It is furthermore proposed that the common memory unit is a memory unit, which is integrated into one of the floor treatment apparatuses. The common memory unit may therefore be a local memory unit of one of the floor treatment apparatuses. Although the common memory unit is thereby integrated, i.e. installed, into the floor treatment apparatus, the other floor treatment apparatuses of the system equally access the common memory unit. In this case, it is advantageous that no separate common memory unit is required.

It would alternatively be conceivable that the common memory unit is a memory unit of a base station, which is realized separately of the floor treatment apparatuses. It is particularly proposed that this base station is also designed for performing a service task on at least one of the floor treatment apparatuses. The base station either may merely serve for keeping ready the common environment map for the floor treatment apparatuses and for making available the computing unit, which reconciles the different environment maps of the floor treatment apparatuses and/or the common memory unit, or for additionally performing a service task for one or preferably all floor treatment apparatuses. The base station may feature, in particular, a charging device for charging a rechargeable battery of the floor treatment apparatus, a suction device for emptying a dirt collection container of the floor treatment apparatus or the like. The floor treatment apparatus can preferably dock with the base station such that, in particular, a mechanical connection is produced and a data communication link is established. The base station featuring the common memory unit then serves as an external memory that can store data and from which data can be retrieved. The base station therefore serves as an external memory such as, for example, an external USB stick or the like. The data transmission between the floor treatment apparatus and the base station may, in principle, be realized exclusively via a wireless communication link, wherein the floor treatment apparatus does not dock with the base station in this case.

It is furthermore proposed that the selection criterion is a parameter of the environment map. The selection criterion particularly may be a time of generation and/or a depth of detail of the environment map and/or a parameter of a detection device used for recording the environment data and/or of a control unit of the floor treatment apparatus. The decision on one of multiple environment maps as common environment map therefore may be based, for example, on the rule that older environment maps are always overwritten with the most recent environment map. Alternative rules may stipulate, for example, that an environment map of a floor treatment apparatus, which was generated with a higher-quality sensor system and/or control electronics, is always stored as common environment map. A relevant parameter of a detection device used for recording the environment data of the environment map may be, for example, a resolution, a contrast, the type of sensor, e.g., in the form of an image acquisition device or a distance measuring device, a color sensitivity of the detection device or the like. The depth of detail of the environment map may also be used as selection criterion. The information density within the environment map, for example, may be relevant with respect to a depth of detail. For example, a first environment map merely contains a two-dimensional representation of the environment whereas a second environment map offers a three-dimensional representation or a two-dimensional representation with additional information. The additional information may contain, for example, the indication of a height in the form of color coding or the like.

Furthermore, the type and/or quality of a control unit of the floor treatment apparatus may also be used as selection criterion. The control unit of the floor treatment apparatus features control electronics that control the floor treatment apparatus within the environment. Due to the selection criteria applied to the comparison of the environment maps, it is ensured that the best environment map possible of all floor treatment apparatuses of the system is respectively used and this environment map is also made available to all floor treatment apparatuses in the common memory unit.

In addition to the above-described system, the invention furthermore proposes a method for operating a system with at least two self-traveling floor treatment apparatuses, wherein a detection device records environment data within the environment of the floor treatment apparatus, wherein a navigation and self-localization device of the floor treatment apparatus generates an environment map based on the environment data, and wherein a computing unit compares an environment map of a first floor treatment apparatus with an environment map of a second floor treatment apparatus and/or with an environment map stored in the common memory unit and specifies which of the environment maps is stored in the common memory unit and/or in a local memory of a floor treatment apparatus based on a defined selection criterion. The thusly achieved advantages, as well as the characteristics of the method, can be gathered from the preceding functional description of the inventive system.

It is particularly proposed that an environment map stored in the common memory unit is at least partially overwritten with an environment map of one of the floor treatment apparatuses and/or that an environment map stored in one of the floor treatment apparatuses is at least partially overwritten with an environment map stored in the common memory unit. In this case, reconciling of the maps may take place, for example, when a floor treatment apparatus transmits an environment map generated thereby to the common memory unit, in which an environment map, e.g. with an earlier date, is already stored. The computing unit compares the two environment maps with one another and overwrites the environment map stored in the common memory unit with the environment map of the floor treatment apparatus if the defined selection criterion specifies this outcome. The environment map of the common memory unit is then either replaced completely or only partially, if applicable only with respect to parts of the environment map that differ in the two environment maps. Furthermore, a self-generated environment map of a floor treatment apparatus may be overwritten, at least partially, if an environment map stored in the common memory unit better meets the defined selection criteria applied to the comparison, i.e. if it has a greater depth of detail due to a larger volume of information. In this case, the floor treatment apparatus adopts the common environment map upon a data reconciliation of a local map of the floor treatment apparatus with the environment map stored in the common memory unit.

It is proposed that the environment maps of the floor treatment apparatuses and/or the common memory unit are compared during a break in operation of the floor treatment apparatus or the floor treatment apparatuses. It is advantageous if a floor treatment apparatus does not carry out any other tasks while an environment map of this floor treatment apparatus is compared with an environment of the common memory unit. However, other floor treatment apparatuses of the system can continue to operate. When the environment maps of multiple floor treatment apparatuses are compared with one another, namely with participation of the common memory unit or its computing unit, it is advantageous if both floor treatment apparatuses are at a standstill. The break in operation of the floor treatment apparatus makes it possible to stop a navigation and self-localization program of the floor treatment apparatus, which otherwise would usually update the environment map continuously, for example as part of a Slam method, during the progressive motion of the floor treatment apparatus.

It is furthermore proposed that the selection criterion being compared is a parameter of the environment maps. The selection criterion, which decides on the selection of an environment map, particularly may be a time of generation and/or a depth of detail of the environment map and/or a parameter of a detection device used for recording the environment data and/or of a control unit of the floor treatment apparatus. One or more selection criteria, which distinguish the environment maps of the floor treatment apparatuses and/or the common memory unit from one another, are applied to the comparison of the environment maps, wherein the respective environment map specified as the common environment map has, for example, a larger volume of information, a superior resolution and/or a latest version or a more recent date of generation. Furthermore, other selection criteria can basically also be applied. With respect to the application of the selection criteria, we refer to the preceding functional description of the system.

It is furthermore proposed that the environment map is stored in a memory unit of a base station, which is realized separately of the floor treatment apparatuses, and/or adopted from a memory unit of a base station, which is realized separately of the floor treatment apparatuses. For example, the common memory unit forms part of a base station, which in addition to fulfilling a mere storage function can also perform a service task on the floor treatment apparatus such as, for example, charging a rechargeable battery of the floor treatment apparatus, empty a dirt collection container or the like. It is preferred that the floor treatment apparatus mechanically docks with the base station and establishes a communication link between its local memory and the common memory unit of the base station such that either an environment map of the floor treatment apparatus is stored in the common memory unit or an environment map is loaded into the local memory of the floor treatment apparatus from the common memory unit of the base station. In this case, the environment map is preferably not extracted from the common memory unit. In fact, a copy of the environment map is generated.

It is ultimately proposed that the environment map is stored, extracted or copied at a time, at which the floor treatment apparatus is connected to the base station in order to perform a service task. This is particularly advantageous because the floor treatment apparatus does not move relative to the environment while it is docked with the base station and the navigation and self-localization device, which continuously reconciles and updates the environment map, is therefore also inactive. A service task on the floor treatment apparatus, for example charging a rechargeable battery and transmitting an environment map, can therefore be simultaneously performed at the base station during a break in operation.

BRIEF DESCRIPTION OF THE DRAWINGS

The invention is described in greater detail below with reference to exemplary embodiments. In the drawings:

FIG. 2 shows a system with two self-traveling floor treatment apparatuses and a common memory unit integrated into one of the floor treatment apparatuses.

DETAILED DESCRIPTION OF THE PREFERRED EMBODIMENTS

Figure 1:
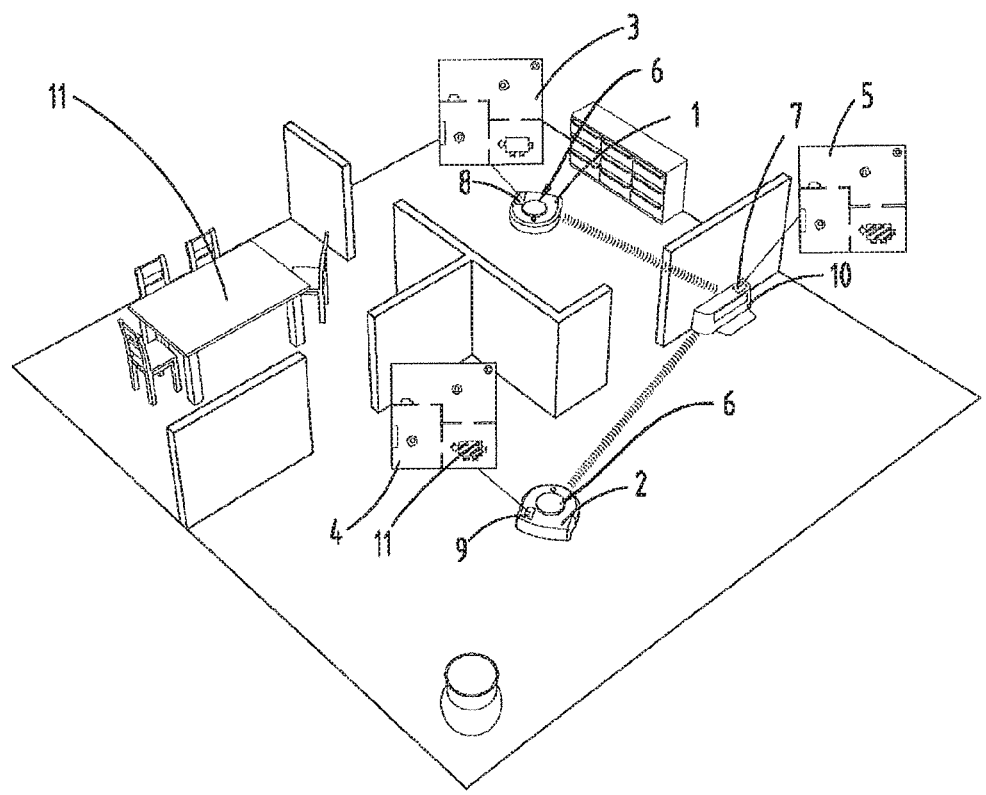
FIG. 1 shows a system with two self-traveling floor treatment apparatuses and a common memory unit realized separately thereof.

FIG. 1 shows an environment, namely a section of a residence with multiple rooms. A plurality of obstacles 11 such as, for example, pieces of furniture and room boundaries are arranged in the rooms. A system consisting of two self-traveling floor treatment apparatuses 1, 2, as well as a base station 10 with a common memory unit 7, is located in the environment. The base station 10 is a service device, to which each of the floor treatment apparatuses 1, 2 can connect mechanically and communicatively. The base station 10 features a charging device, by means of which a rechargeable battery of the floor treatment apparatuses 1, 2 can be charged. The common memory unit 7 of the base station 10 serves for storing an environment map 5 of the environment shown.

The floor treatment apparatuses 1, 2 respectively feature a local memory 8, 9, in which a respective environment map 3, 4 of their environment is stored. In this case, the floor treatment apparatuses 1, 2 are realized, for example, in the form of a vacuuming robot and a wiping robot. The floor treatment apparatuses 1, 2 feature motor-driven wheels, by means of which the respective floor treatment apparatus 1, 2 can travel within the environment. The floor treatment apparatuses 1, 2 furthermore feature (not-shown) cleaning elements, for example a lateral brush, a bristle roller and/or a wiping roller that is covered with a wiping cloth. The cleaning elements serve for acting upon a surface to be cleaned. A floor treatment apparatus 1, 2 in the form of a vacuuming robot furthermore features a not-shown suction mouth, through which air contaminated with dirt can be sucked into the floor treatment apparatus 1, 2 by means of a motor-blower unit. A floor treatment apparatus 1, 2 in the form of a wiping apparatus features, for example, a liquid application device and a liquid tank, from which liquid can be delivered to the cleaning element and/or the surface to be cleaned by means of the liquid application device. The floor treatment apparatuses 1, 2 respectively feature a not-shown rechargeable battery for the power supply of the individual electrical components of the floor treatment apparatuses 1, 2, e.g. the drive for the wheels, the cleaning elements and additionally provided electronics.

Furthermore, the floor treatment apparatuses 1, 2 are respectively equipped with a detection device 6, which in this example features a triangulation measuring device. The detection device 6 measures distances from obstacles 11 within the environment. The respective detection devices 6 specifically feature a laser diode, the light beam of which is emitted from a housing of the floor treatment apparatus 1, 2 by means of a deflection device and rotatable, particularly within an angular range of 360 degrees, about a rotational axis that extends vertically in the orientation of the floor treatment apparatus 1, 2 shown. An all-around distance measurement about the floor treatment apparatus 1, 2 can thereby be realized. The detection device 6 makes it possible to survey the environment in a preferably horizontal plane, i.e. in a plane extending parallel to the surface to be cleaned. In this way, the floor treatment apparatus 1, 2 can travel within the environment while avoiding a collision with the obstacles 11. The environment data recorded by means of the detection device 6, which represents distances from the obstacles 11, is used for generating an environment map 3, 4 of the environment. Furthermore, the floor treatment apparatus 1, 2 may feature, for example, a not-shown odometry sensor that measures the distance traveled by the respective floor treatment apparatus 1, 2. It would furthermore be conceivable, for example, that a floor treatment apparatus 1, 2 features a contact sensor or the like.

Furthermore, the floor treatment apparatuses 1, 2 respectively feature a local memory 8, 9 that serves for storing an environment map 3, 4 generated by the respective floor treatment apparatus 1, 2. In the illustration according to FIG. 1, the floor treatment apparatus 1, 2 is communicatively linked with the common memory unit 7 or the base station 10, respectively. In this case, the communication link is realized, for example, in the form of a WLAN connection.

According to this embodiment, the invention is implemented, for example, in such a way that the floor treatment apparatus 1 travels around within the environment and in the process generates an environment map 3 from the environment data measured by the detection device 6. The floor treatment apparatus 1 connects its WLAN communication module to a corresponding WLAN communication module of the base station 10, preferably during a break in operation, i.e. while the floor treatment apparatus is at a standstill. Alternatively, the floor treatment apparatus 1 may also travel to the base station, mechanically dock with the base station and establish a wire-bound communication link with the common memory unit 7 of the base station 10. If no environment map 5 has been stored in the common memory unit 7 as yet, the environment map 3 of the floor treatment apparatus 1 is copied into the common memory unit 7. This new environment map 5 of the common memory unit 7 can then be adopted, for example, by the other floor treatment apparatus 2 of the system. If an environment map 5 has already been stored within the common memory unit 7 when the floor treatment apparatus 1 connects to the base station 10, the two environment maps 3, 5, i.e. the environment map 3 of the floor treatment apparatus 1 on the one hand and the environment map 5 of the common memory unit 7 on the other hand, are compared with one another with respect to defined selection criteria in order to decide which of the environment maps 3, 5 is stored within the local memory 8 of the floor treatment apparatus 1 and/or within the common memory unit 7 of the base station 10. In this example, the selection criterion is a date of generation of the environment maps 3, 5. If it is determined during the comparison that the environment map 3 of the floor treatment apparatus 1 is newer than the environment map 5 already stored in the common memory unit 7, the environment map 5 is replaced with the environment map 3. In this case, the environment map 5 can either be replaced completely or only with respect to parts of the environment map 5, which deviate from the environment map 3 of the floor treatment apparatus 1. Selection criteria other than the date of generation may also be applied to the comparison of the environment maps 3, 5. These selection criteria may be, for example, a depth of detail, i.e. a wealth of information, of the respective environment map 3, 5 or a parameter of the detection device 6 used for recording the environment data and/or a parameter of a control unit of the floor treatment apparatus 1.

When the other floor treatment apparatus 2 subsequently connects to the base station 10 or the common memory unit 7 of the system, respectively, the new environment map 5 stored therein, which was previously the self-generated environment map 3 of the other floor treatment apparatus 1, can be compared with the environment map 4 of the second floor treatment apparatus 2 in an analogous fashion. If this comparison shows, for example, that the environment map 5 stored within the common memory unit 7 is more up-to-date than the environment map 4 stored within the floor treatment apparatus 2, the environment map 5 can be copied from the common memory unit 7 into the local memory 9 of the floor treatment apparatus 2. All in all, a reconciliation between the environment maps 3, 4 of the floor treatment apparatuses 1, 2 and the environment map 5 of the common memory unit 7 is therefore taking place such that all floor treatment apparatuses 1, 2 of the system, as well as the common memory unit 7, optimally have available the same environment map 3, 4, 5.

According to a slightly modified embodiment of the invention, it is also possible that the two floor treatment apparatuses 1, 2 initially transmit their environment maps 3, 4 to the common memory unit 7 of the base station 10, wherein a computing unit assigned to the common memory unit 7 initially compares the two environment maps 3, 4 of the floor treatment apparatuses 1, 2 with one another and, based on defined selection criteria, subsequently identifies the environment map 3, 4 that best meets the selection criteria, in this example the environment map that is more up-to-date. This environment map 3, 4 is then stored in the common memory unit 7 and, if applicable, replaces an existing environment map 5 stored therein.

FIG. 2 shows a system with two self-traveling floor treatment apparatuses 1, 2. In this case, the common memory unit 7 of the system is integrated into one of the floor treatment apparatuses 1, 2 such that the floor treatment apparatus 1 features a local memory 8 for storing a self-generated environment map 3 on the one hand and the common memory unit 7, which the other floor treatment apparatus 2 can also access, on the other hand. Although the common memory unit 7 is in this case assigned to one of the floor treatment apparatuses 1, 2, namely integrated into the floor treatment apparatus 1, the function of this embodiment of the invention with respect to the data communication corresponds to the preceding description of the system according to FIG. 1. The transmission of environment maps 3, 4, 5 is realized, for example, by means of wireless radio communication, e.g. WLAN communication. The floor treatment apparatus 2 does not dock with the floor treatment apparatus 1. However, it is advantageous if the floor treatment apparatuses 1, 2 are at a standstill during a reconciliation of their environment maps 3, 4, 5 such that the environment maps 3, 4, 5 are not updated or used by a navigation and self-localization device while they are reconciled.

LIST OF REFERENCE SYMBOLS

1 Floor treatment apparatus
2 Floor treatment apparatus
3 Environment map
4 Environment map
5 Environment map
6 Detection device
7 Memory unit
8 Memory
9 Memory
10 Base station
11 Obstacle

What is claimed is:

1. A system comprising:
at least two self-traveling floor treatment apparatuses, each of the floor treatment apparatuses having a navigation and self-localization device that is designed for generating an environment map based on environment data of an environment of the floor treatment apparatus,
a detection device configured for recording the environment map,
a common memory unit for storing environment maps; and
a computing unit assigned to the floor treatment apparatuses, wherein the computing unit is designed for comparing an environment map of a first one of the floor treatment apparatuses with an environment map of a second one of the floor treatment apparatuses and/or with an environment map that is already stored in the common memory unit, and for specifying which of the environment maps is to be stored in the common memory unit as a master map based on a defined selection criterion,
wherein in order to specify a certain environment map as the master map to be used by the at least two self-traveling floor treatment apparatuses, the environment maps are compared with one another and evaluated based on one or more defined selection criteria, wherein the environment map, which best meets the defined selection criteria, is specified as the master map,
wherein the defined selection criterion comprises a depth of detail of the environment map in the form of a dimension of a representation of the environment within the environment map and/or a representation of the environment with an indication of a height in the form of color coding.

2. The system according to claim 1, wherein the common memory unit is a memory unit that is integrated into one of the floor treatment apparatuses.

3. The system according to claim 1, further comprising a base station designed for performing a service task on at least one of the floor treatment apparatuses, and wherein the common memory unit is a memory unit of the base station.

4. The system according to claim 1, wherein the selection criterion includes an additional selection criterion comprising a parameter of the environment map, or a parameter of a detection device used for recording the environment data or of a control unit of the floor treatment apparatus.

5. A method for operating a system with at least two self-traveling floor treatment apparatuses, comprising:
recording environment data within the environment of the floor treatment apparatus with a detection device, and generating an environment map with a navigation and self-localization device of the floor treatment apparatus, based on the environment data,
storing the environment map of the floor treatment apparatuses in a common memory unit of the system,
comparing with a computing system an environment map of a first floor treatment apparatus with an environment map of a second floor treatment apparatus and/or with an environment map stored in the common memory unit and
specifying with the computing system which of the environment maps is to be stored in the common memory unit and/or in a local memory of a floor treatment apparatus as a master map to be used by both floor treatment apparatuses based on a defined selection criterion, wherein the environment map, which best meets the defined selection criteria, is specified as the master map,
wherein the defined selection criterion is a depth of detail of the environment map in the form of a dimension of a representation of the environment within the environment map and/or a representation of the environment with an indication of a height in the form of color coding.

6. The method according to claim 5, wherein the environment map stored in the common memory unit is at least partially overwritten with an environment map of one of the floor treatment apparatuses or with an environment map stored in the common memory unit.

7. The method according to claim 5, wherein the environment maps of the floor treatment apparatuses and/or the common memory unit are compared during a break in operation of at least one of the floor treatment apparatuses.

8. The method according to claim 5, wherein the selection criterion being compared further comprises at least one an additional selection criterion comprising a parameter of the environment maps, a parameter of a detection device used for recording the environment data or a parameter of a control unit of the floor treatment apparatus.

9. The method according to claim 5, wherein the environment map is stored in or adopted from a memory unit of a base station, which is realized separately of the floor treatment apparatuses.

10. The method according to claim 9, wherein the environment map is stored, extracted or copied at a time during which the floor treatment apparatus is connected to the base station in order to perform a service task.

* * * * *